United States Patent [19]

Tevruchte et al.

[11] 4,354,290
[45] Oct. 19, 1982

[54] CONVERTIBLE HOUSE TRAILER

[76] Inventors: William B. Tevruchte, R.R. #1, Roseneath, Ontario, Canada; Julian B. Beecroft, P.O. Box 27, Whitby, Ontario, Canada, L1N 5R7

[21] Appl. No.: 66,662

[22] Filed: Aug. 15, 1979

[51] Int. Cl.³ .............................................. B63C 13/00
[52] U.S. Cl. ..................................... 114/344; 114/61; 280/43.2; 280/414.2
[58] Field of Search ...................... 9/1.2; 114/61, 270, 114/162; 280/414 A, 43, 43.17, 43.2; 244/102 A, 102 R, 105

[56] References Cited

U.S. PATENT DOCUMENTS

| 1,626,185 | 4/1927 | Coder et al. | 280/43.20 |
| 3,172,134 | 3/1965 | Livingstone | 9/1.2 |
| 3,709,185 | 1/1973 | Hennel | 114/162 X |
| 3,755,838 | 9/1973 | Dunagan | 9/1.2 |

FOREIGN PATENT DOCUMENTS 7702293  9/1978  Netherlands ......................... 114/61

Primary Examiner—Sherman D. Basinger
Attorney, Agent, or Firm—Robert S. Smith

[57] ABSTRACT

A convertible house trailer comprises a cabin portion containing the living quarters, a road wheel assembly, by which the cabin is supported on land, and having a movable linkage connecting the road wheels to the cabin. The road wheels may be retracted upwardly, when the structure is used on the water. Typically four floats, comprising front floats and rear floats, are attached beneath the cabin on a movable linkage, each of the floats comprising a flat-bottomed elongated float structure with the bottom surface of the floats being directed downwardly. An extension mechanism is connected between the cabin and the floats which may be operated so as to extend the floats from a first upwardly retracted position, downwardly into a second position, in which they are extended beneath the cabin at a slight outward angle for use on the water, when in motion, and a third fully outwardly spread position, when the floats are extended outwardly to either side of the cabin, for use in a moored or stationary condition.

4 Claims, 11 Drawing Figures

CONVERTIBLE HOUSE TRAILER

The invention relates to a house trailer which is convertible into a houseboat for use on the water.

BACKGROUND OF THE INVENTION

The desirability of providing a house trailer which can be used on land, and which can be converted into a houseboat for use on the water has been apparent for many years. There have been numerous proposals for providing house trailers with some form of pontoons or floats, which may be attached beneath the main structure, so that it will float on the water. However, such earlier proposals have for the most part simply been interesting paper proposals, which have been totally impracticable either from the manufacturing point of view, or alternatively from the user's point of view.

For example the storage of the floats, when the house trailer is used on land has been proposed in a variety of locations around the structure, with a variety of different forms of linkages for securing the floats beneath the main structure.

In the majority of cases, such proposals were excessively complex to manufacture, and were inherently liable to failure especially when used on the water, due to the instability of the float mounting. In addition, the operation of the mechanism to move the floats from one position to another was excessively complicated and difficult so that the actual user would find that the entire operation was probably more trouble than it was worth.

BRIEF SUMMARY OF THE INVENTION

The invention therefore seeks to provide a convertible house trailer which comprises a cabin portion containing the living quarters, a road wheel assembly, by means of which the cabin is supported on land, and having a movable linkage connecting the road wheels to the cabin. This structure permits the road wheels to be retracted upwardly, when the structure is used on the water. The structure has floats, typically four floats, comprising front floats and rear floats, attached beneath the cabin on a movable linkage, each of the floats comprising a flat-bottomed elongated float structure with the bottom surface of the floats being directed downwardly, and there being an extension mechanism connected between the cabin and the floats, which may be operated so as to extend the floats from a first upwardly retracted position, downwardly into a second position. In the second position the floats are extended beneath the cabin at a slight outward angle for use on the water, when in motion. In a third fully outwardly spread position, the floats are extended outwardly to either side of the cabin, for use in a moored or stationary condition.

The invention further comprises the provision of a movable linkage connecting the floats below the cabin, consisting of pairs of parallel legs pivotally mounted on the floats and on the cabin, so that the bottom walls of the floats are always facing downwardly beneath the cabin, with the floats being swingable in a generally arcuate manner, while remaining in common planes with one another.

The invention further comprises a scissors type linkage movably supporting the road wheels, whereby the same may be raised and lowered.

The invention further comprises a trailer hitch in conjunction with the house trailer, the trailer hitch being provided with a movable nose wheel, which may be lowered for launching, or for moving the trailer when on land, and which may be raised for use on the road or on the water.

The invention further comprises auxilliary jack assemblies for providing additional support for the floats in certain circumstances.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

Figure 1:
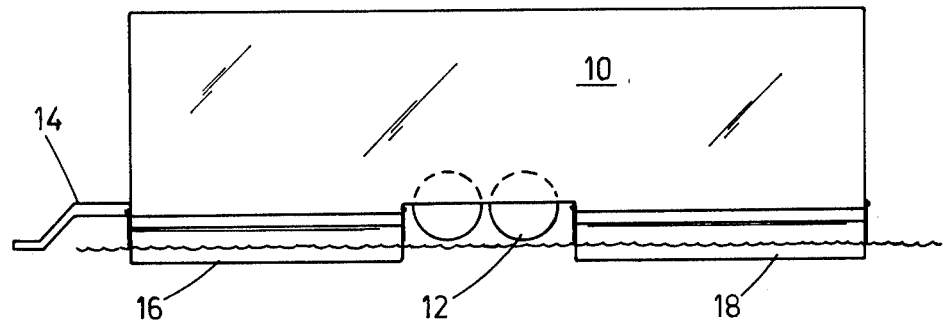
FIG. 1 is a side elevational view, partly in phantom and in an essentially schematic form, showing the trailer according to the invention.

Referring now to FIG. 1, it will be seen that the invention, shown schematically, comprises a trailer type cabin shown generally as 10, having road wheels 12, and a towing bar 14. The details of the interior of the cabin 10, are irrelevant and, except as specifically described hereinafter, are subject to wide variation. It will however of course provide the usual sleeping accommodation and living accommodation and cooking, washing and sanitary facilities typical in such cabins whether they be road trailers, house boats or the like.

Likewise the road wheels 12, in so far as their function on the road is concerned will be typical, and the towing bar 14 is also essentially similar to other such towing bars, in so far as it provides for the road function.

As described below however, the road wheels 12 themselves are attached on a retractable mechanism by means of which they may be raised to keep them out of the water when the trailer is used in its houseboat or water-borne mode.

Likewise certain modifications in the towing bar 14 also adapt to the water mode.

Figure 2A:
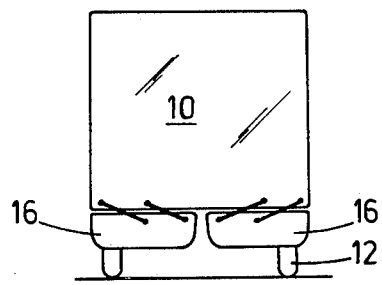
FIGS. 2a, 2b and 2c are essentially schematic end views showing the trailer, with three positions for the moveable floats, and two positions for the moveable wheel suspension.
Figure 2B:
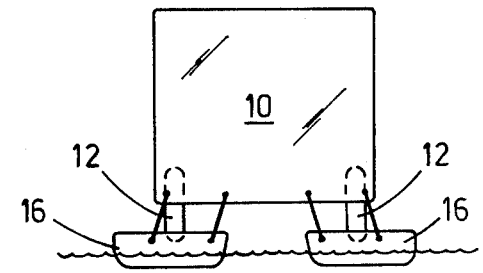
Figure 2C:
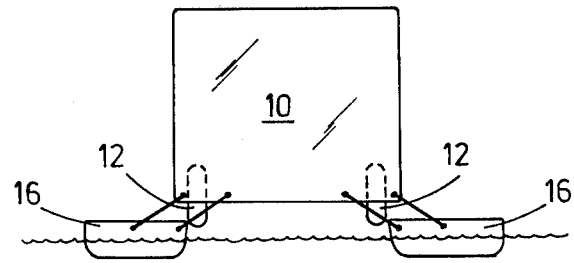

The floats 16—16 and 18—18 are mounted in pairs at the front and rear ends of the cabin 10 as shown. As best shown in FIGS. 2a, 2b, and 2c, they are movable between a stored position (Reference FIG. 2a) in which they are raised upwardly beneath the cabin 10; and a water-mobile position (Reference FIG. 2b) in which they are extended downwardly and to some distance outwardly beneath the cabin 10; and a third water-stationary position (2c) in which they are swung fully outwardly, to provide somewhat greater stability.

Also not shown in any of the figures, is any form of motive power for the house trailer boat, when in its water-borne mode.

Clearly some such form of motive power will be necessary. Preferably the drive will be a pair of hydraulic outboard motors, hydraulically coupled to provide forward and reverse motion with steering in the manner of twin screws. A suitable motor and hydraulic power unit will be located in a closed compartment off the cabin. Such hydraulic drives will, in one form of the invention, be attached to the back of the rearmost floats 18, and will have hydraulic hose couplings where they could be readily removed for road travel and storage.

Alternatively, gasoline outboard motors may be mounted on suitable brackets attached to the rear of the cabin 10. Such motors may be lowered into the water or raised clear by means of swing brackets in a manner well known in the marine motor art.

Also there will, of course, be suitable controls for the motors and drive, by means of which the entire houseboat may be driven forwardly or reversed, or steered when on the water.

Again, such controls are well known in the marine engineering art and require no further description.

A control fin may also be provided, movably attached beneath the cabin, as described hereinafter.

Figure 3:
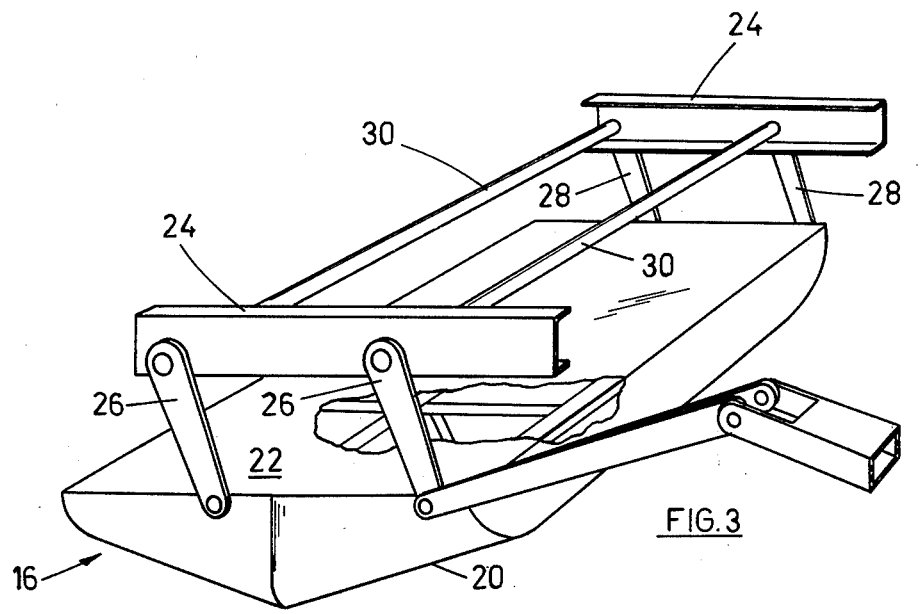
FIG. 3 is a fragmentary perspective illustration of a float and a portion of the associated mechanism.

Referring now to FIG. 3, the float 16 as illustrated there is merely exemplary of all of the floats 16 and 18 which are essentially of the same general shape and construction. Thus each float 16 or 18 comprises a hull portion 20, and a completely closed deck portion 22. The hull portion 20 may be faired at its ends, and the underside of the hull 20 may be flat or may be given a shallow V formation, or whatever hull design is chosen.

Each of the floats 16 and 18 is suspended on frames 24, on the underside of the cabin 10. Such frames 24 are a part of the supporting framework of the cabin 10.

Each of the front floats 16 is swingably supported on a pair of front legs 26, 26 and a pair of rear legs 28, 28. Similarly, although not shown in the drawing, each of rear floats 18 is supported on a pair of front legs 28, 28 and a pair of rear legs 26, 26 in the same manner as the floats 16. The legs 26 and 28 are all swingably mounted under cabin 10 on frame 24, and they are each swingably fastened to a respective float 16 or 18. Each of the legs 28 and the legs 26 are keyed to a torque tube 30. Stated another way, each torque tube 30 has one leg 26 and one leg 28 coupled thereto. Each pair of coupled legs 26, 28 will thus swing to and fro beneath the frame 24 in unison. It will be seen that the spacing between the upper and lower ends of all pairs of legs 26, 28 is the same so that the cabin frame the connecting legs 26, 28 always remain in the form of a parallelogram.

It will of course be understood that suitable bushings or the like will be provided in holes or mounts in the frames 24 to carry tubes 30 in a swingable manner. Similarly, suitablle bushings (not shown) are provided at the lower ends of the legs where they are fastened to the floats.

Figure 4:
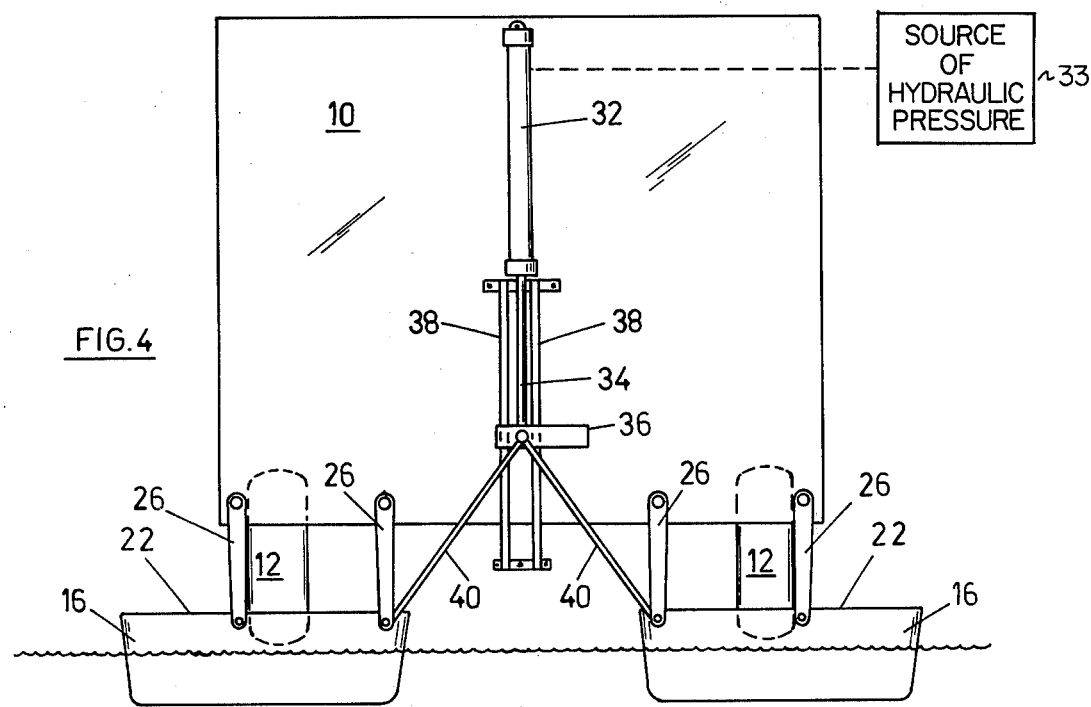
FIG. 4 is an end elevational view of the trailer showing the float operating mechanism.

Referring now to FIG. 4, the operating mechanism by means of which the floats 16 and 18 may be swung inwardly and outwardly is described in more detail.

Essentially, it will provide some form of mechanical or hydraulic or power operated linkage whereby the floats may be swung between the retracted i.e. upward position of FIG. 2a, the downward position of FIG. 2b or the outward position of FIG. 2c.

In addition, the linkage should be of sufficient strength that it may be locked in position, so that, in the positions illustrated in FIGS. 2b and 2c the linkage will support cabin 10 and its occupants in whatever water conditions may reasonably be anticipated. The linkage should also be readily capable of being operated by the owner or user.

In the case of the present embodiment of the invention, such operating mechanisms will be seen to comprise a hydraulic cylinder 32 mounted vertically in the center of the rear end of the cabin and a source of hydraulic pressure 33. It will be appreciated that only one end of the cabin 10 is being shown. However, there will be a similar cylinder and operating mechanism at the opposite end, the details of which are essentially the same and are accordingly omitted for the sake of simplicity.

The operating rod 34 of the cylinder 32 connects with a slide block 36. The block 36 is slideable upwardly and downwardly on two guide bars 38. The guide bars 38 extend in a vertical manner parallel to the axis of the cylinder 32, from about the mid point of the cabin 10 downwardly.

Attached to the slide block 36 are two thrust links 40, which extend from the block 36 downwardly and outwardly and pivotally connect with respective floats, in this case floats 16—16, at the lower ends of the inboard rear legs 26 as shown.

In some forms of the invention, the two inboard legs 26 (and similarly the two inboard legs 28 on the front end of the cabin) may be provided with offset lever members (not shown) to which the lower ends of the thrust links 40 are attached, so as to provide the maximum flexibility of movement, while retaining an adequate mechanical advantage throughout the full extent of its range of movement.

Extension of the operating rod 34 of the cylinder 32 will force the block 36 downwardly on guide bars 38 thereby forcing the links 40 downwardly and outwardly and thereby in turn producing downward and outward swinging movement of the floats 18. The opposite movement of the block 36 will retract them.

The same mechanism and nature of operation is of course provided for the floats 16 as explained above.

However, the two hydraulic cylinders 32 will be provided with separate operating means and controls (not shown) so that they may be operated separately. Clearly, the use of the hydraulic cylinder 32 and thrust links 40 in this location is but one of a variety of different means of swinging the floats 16, 18 inwardly and outwardly. Other similar forms of operating mechanism could for example be provided beneath the cabin 10, operating in an essentially transverse manner. For example, the hydraulic cylinder 32 may be disposed transversely instead of vertically, on the end walls of cabin 10. In addition, forms of operating mechanism other than the hydraulic cylinder 32 may be used. For example, other forms include a screw, a reduction gear system, a handle, a cable system, or an electric motor.

However, it is believed that the use of a hydraulic cylinder and direct thrust links 40 provides a secure and positive means of operating, and one that is capable of providing a sufficient degree of power and rigidity to the entire system.

Such cylinders 32 may be supplied with hydraulic fluid utilized in the main drive motor (described above) and controlled by suitable valves (not shown).

Positional locks may be incorporated in the system so that it may be locked solidly in any particular location, as described below (see FIG. 9).

Figure 5:
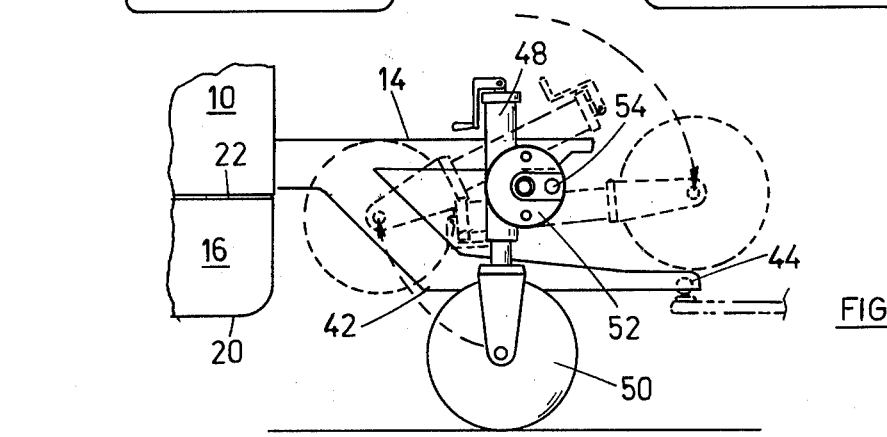
FIG. 5 is a fragmentary side elevational view of the front or nose wheel apparatus.

In order to assist in maneuvering the entire cabin 10 when on the land, and during launching, the tow bar 14 will be seen from FIG. 5 to comprise a generally Y-shaped yoke 42, extending forwardly and downwardly with respect to the cabin 10, and terminating at its forward end in the usual cup 44, suitable for receiving a towing ball (not shown) on a vehicle.

Carried on the yoke 42 is a manually operable extension jack 48 which carries a nose wheel 50.

The jack 48 is pivotally mounted on the yoke 42, and is provided with a multi-position locking disc 52. By suitably positioning and locking the locking disc 52, e.g. by means of a locking pin 54, the nose wheel 50 may be located in its lowered position for use when parking, or when launching. It may also be swung upwardly and inwardly for towing on the road, or may be rotated a further 180°, so that it in fact extends forwardly of the cup 44. This position is particularly suitable for use on the water since the wheel 50 may then act as a forward bumper, and will in any event prevent the forward end of the yoke 42 from driving into any objects such as a bank, or a dock or the like where it might easily become damaged.

The function of the jack 48 is to permit the nose wheel 50 to be raised or lowered to thereby level the cabin 10 when the apparatus is, for example, parked on land.

Swinging of the nose wheel 50 into either of its other positions will simply be achieved by hand and locked by a pin 54.

In the water-borne mode of operation, it is desirable that the road wheels 12 shall be capable of being raised or retracted out of the water.

Figure 6:
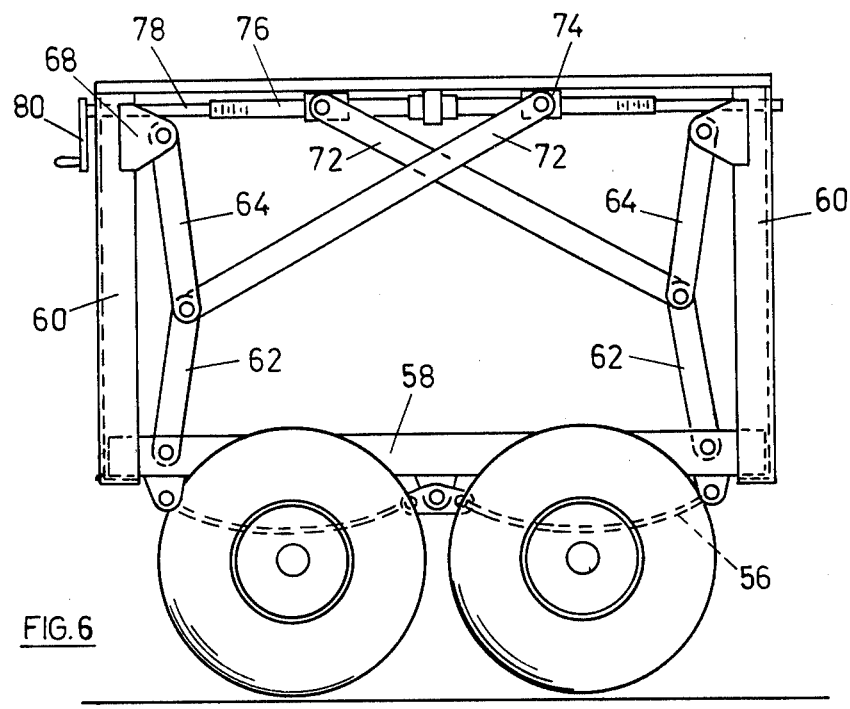
FIG. 6 is a side elevational view of the road wheel suspension assembly.

In order to do this, a retractible suspension mechanism is provided as shown in FIG. 6.

As shown in this illustration, the road wheels 12 are mounted typically on leaf springs 56, which are themselves mounted on a longitudinal support bar 58. The opposite ends of the bar 58 are received in vertical guide channels 60, within which they are slideable, the guide channels 60 being located in a suitable wheel well formed in the sides of the cabin 10.

The support bar 58 is vertically moveable within the confines of wheel well, while remaining always essentially parallel to the longitudinal axis of the cabin 10. In order to provide such a movement of support bar 58, support bar 58 is provided at either end with a pair of scissors links 62 and 64. Each link 62 is pivotally connected directly to the bar 58, and each link 64 is pivotally connected to a bracket 68. The links 64 and 62 are pivotally connected at their cooperating ends.

Operating arms 72 are pivotally connected at the pivotal junction between the links 64 and 62.

At their upper ends, the operating arms 72 are pivotally fastened on threaded slide members 74 which are in turn threadedly engaged on respective right and left hand threads 76 of a jack screw 78. Any suitable operating means e.g. the hand wheel 80 may be provided for rotating the jack screw 78 so as to force the threaded members 74 either apart or together.

In this way, an upward and downward movement of the support bar 58 and its associated road wheels 12 can be provided.

Obviously, this operating mechanism is but one of a variety of such mechanisms which could be suitable for the purpose, and illustrated simply by way of example.

In certain circumstances, it may be desireable to provide for additional support for the floats 16 and 18.

Figure 7:
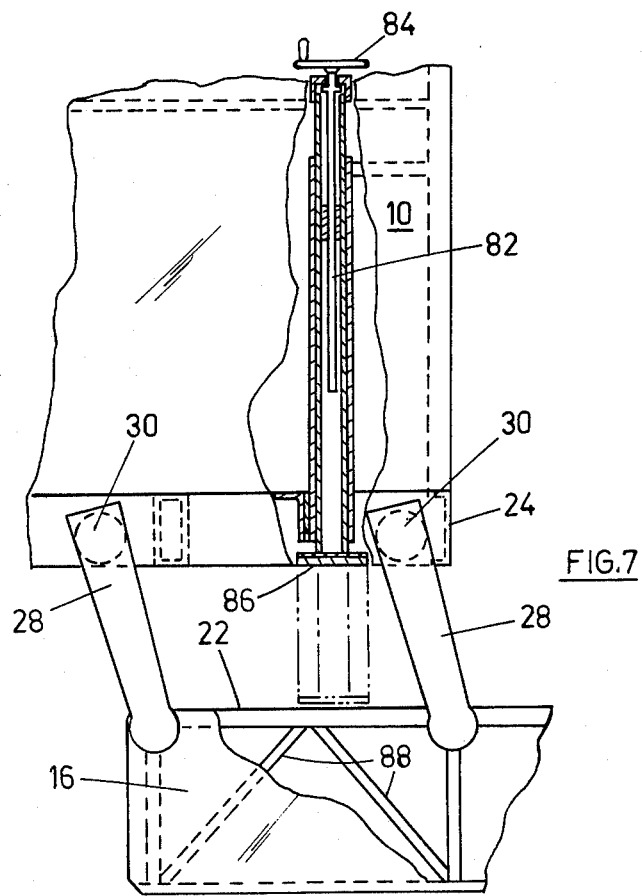
FIG. 7 is a fragmentary broken away side elevational view showing the jack assembly in two positions.
Figure 8:
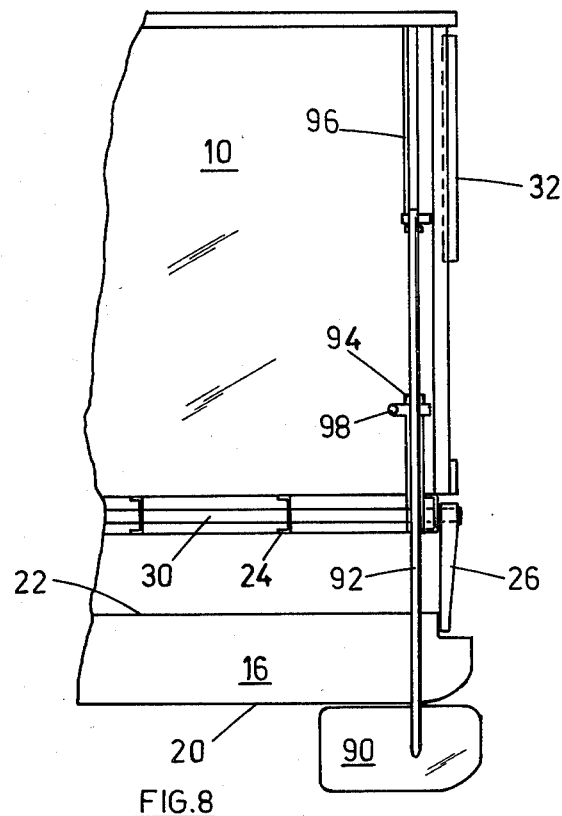
FIG. 8 is a side elevation, partly in section of a further feature.

One such a support system is shown in FIG. 7.

This support system would suitably be provided for the inner ends of the floats 16 and 18, i.e. their ends closest to the wheel wells. Accordingly such systems would usefully be provided somewhere within the interior of cabin 10.

Typically such systems would comprise four telescopic rod members 82 operated by a hand wheel 84, and mounted in sleeves 86 by any suitable brackets to cabin 10 and to frame 24.

Suitable threaded extension means (not shown) would be provided within sleeves, whereby upon rotation of the hand wheels 84 the rod members 82 would extend downwardly or be retracted upwardly.

At the lower end of rod members 82 there are provided cushioned pressure pads 86 having a sufficient area that they may safely engage on the deck 22 of floats 16 or 18. The floats may be suitably braced or reinforced by interior struts 88.

In this way, additional firm support may be provided for the floats 16 and 18, in addition to the arrangements of legs 26 and 28 and torque tubes 30, if this should be found to be necessary.

In order to assist in limiting leeward movement of the craft in a crosswind, a retractable control fin 90 is provided, located toward the front of the cabin. Fin 90 is mounted on a rotatable post 92 extending upwardly inside the front of the cabin. The post 92 is provided with a rotatable collar 94, and a counter balance system, e.g. springs 96 are connected to collar 94, so that it can be lowered and raised without strain. A positional locking mechanism or clamp 98 is provided for locking the fin 90 at the desired depth and angled position, so as to counteract drift or leeway in a cross wind.

As mentioned above, a positional locking system may be incorporated, for positionally locking the floats in one or more outwardly swung positions.

Figure 9:
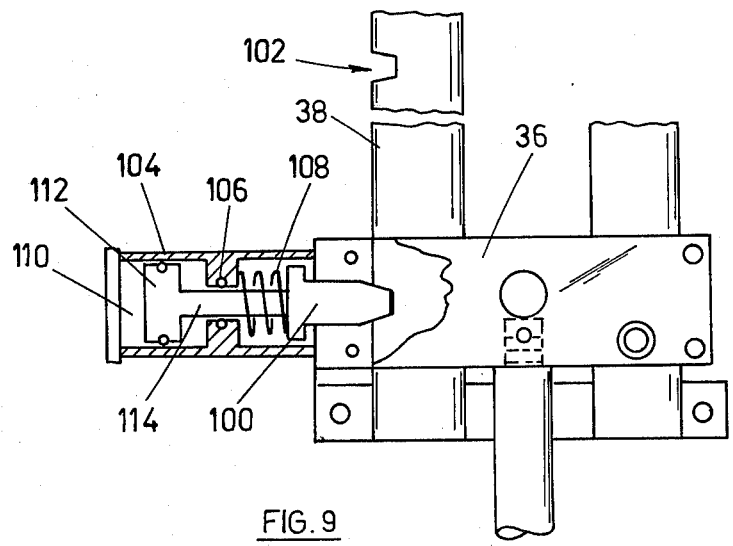
FIG. 9 is a sectional side elevation of the positional locking system.

Referring now to FIG. 9, such a locking system will be seen to comprise a spring loaded locking pin member or pin 100, slidable within slide block 36, and oriented to fit into one or other of holes 102, provided in one of the guide rods 38. The pin 100 is located within a cylindrical sleeve 104, having an intermediate guide bushing 106. A spring 108 controls movement of the pin 100, and abuts against bushing 106.

Within a counterbore 110, in a sleeve 104, a piston member 112 is provided, connected by means of a rod 114 to a pin 100.

By means of suitable hydraulic hoses, (not shown) hydraulic fluid may be admitted to the counterbore 110 so as to withdraw pin 100 from a recess 102. When the hydraulic pressure is released, the spring 108 will return the pin 100 into the recess 102.

In this way, the pin 100 will simply latch into one recess 102, thereby automatically locking the slide block 36 in position.

Clearly, more than one such recess 102 may be provided, thereby providing a number of different positions, although in the majority of cases only three such recesses would be provided, corresponding to the three positions of the floats as described.

The operation of the houseboat trailer is self-evident, but the launching procedure may briefly be described.

In the road condition, as shown in FIG. 2a the floats 16 and 18 are fully retracted underneath the cabin 10, and the wheels 12 are extended into their lower position.

The nose wheel 50 is also swung into its retracted position.

When it is desired to convert to the water-mode the cabin 10 is backed down a suitable ramp (not shown) typically a marine launching ramp, until its rear end is sufficiently extended over the water that the rearward floats 18 may safely be lowered.

The nose wheel 50 is then swung down into contact with the ramp to take the weight off the towing vehicle.

The float operating mechanism i.e. the cylinder 32 for the floats 18 is then operated so as to extend the floats 18 downwardly into their lower most position as shown in FIG. 2b.

The lowering of the floats 18 will usually take the weight of cabin 10 off the road wheels 12.

At this point the weight of cabin 10 is then shared between the floats 18 at its rearward end, and the nose wheel 50 (and towing bar 14) on the vehicle.

The jack 48 may be suitably adjusted to provide the desired degree of sharing of the load.

Road wheels 12 are then retracted by means of the retraction mechanism and operation of the hand wheel 80 and rods 78.

The towing vehicle (not shown) is then backed somewhat further down towards the water so that the forward floats 16 are then over water that is sufficiently deep that they too can be extended.

The cylinder 32 for the floats 16 is then operated so that they also swing downwardly into the position shown in FIG. 2b.

The towing vehicle is then disengaged from the tow bar and driven away. The cabin 10 may then be pushed out on the water, and the nose wheel 50 rotated into its forward position, leaving the entire cabin 10 floating on the four floats 16 and 18.

Normally, after the attachment of suitable outboard motors or other source of power, the mobile waterborne mode will be as shown in FIG. 2b.

When a suitable mooring site is reached, the entire unit may be tethered, and the cylinders 32 may then be operated to extend the floats 16 and 18 outwardly still further so as to provide a somewhat more stable position and a somewhat greater degree of comfort.

In addition, the floats 16 and 18, in their outwardly extended or spread position, leave a greater portion of their decks 22 displaced outwardly on either side of the main cabin 10, thereby providing a deck space for recreational purposes such as swimming or tethering a boat or the like.

Catwalks (not shown) may be provided to bridge gaps between the floats for walking.

When in the position for water born travel (FIG. 2b), if it is found to be necessary, the four telescopic rod members 82 may be extended downwardly, bringing the pressure pads 86 into contact with the decks 22 of the floats 16 and 18, thereby assisting in stabilizing the position of the floats 16 and 18.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A convertible house trailer adapted for use as a house boat, said trailer comprising:

a cabin portion;

road wheels movably mounted on said cabin portion, and having linkage means whereby the same may be raised to a water position and lowered to a road position;

tow bar means connected to said cabin, whereby the same may be towed when on land, and having lower and upper positions;

float means movably mounted beneath said cabin, and having deck portions and hull portions, and movable support means connecting the same to said cabin, said float means being movable between at least a first raised road position, beneath said cabin, with said deck portions facing upwardly and said hull portions facing downwardly, and a lower water position beneath said cabin, with said deck portions facing upwardly and said hull portions facing downwardly;

first controllably operable movement means connecting between said float means and said cabin, whereby said float means may be moved from one position to the other, and located and fastened in such position;

said float means being movable between first, second and third positions which are respectively said first raised road position as aforesaid, a second water-mobile position, wherein said float means is located at a distance beneath said cabin, and a third outwardly spread water-stationary position, wherein said float means is extended outwardly on either side of said cabin, said float means in each of said positions having said deck portions facing upwardly and said hull portions facing downwardly;

said convertible house trailer further including second controllably operable movement means connected beneath said cabin and said road wheels; and said float means each comprises an elongated hollow seated structure having a generally flat bottom and side walls extending upwardly therefrom, said bottom and said side walls defining said hull portions, and a flat deck extending to said side walls, said float means including a pair of parallel first mounting legs disposed at the front of each of said structures and a second pair of mounting legs at the rear of each of said structures, said first and second mounting legs having lower ends pivotally mounted, at points spaced apart a first distance, to said float structure and upper ends pivotally mounted, at points spaced apart said first distance, to said cabin and connection means coupling said legs in pairs for movement in unison, whereby said floats may swing relative to said cabin, while remaining in planes parallel to the horizontal plane of said cabin with their decks uppermost, and their hull portions lowermost.

2. A convertible house trailer as claimed in claim 1 further including:

float stabilizing members, telescopically extendable upwardly and downwardly into engagement with said float means therebeneath, and operating means for said float stabilizing means.

3. A convertible house trailer adapted for use as a house boat, said trailer comprising:
- a cabin portion;
- road wheels movably mounted on said cabin portion, and having linkage means whereby the same may be raised to a water position and lowered to a road position;
- tow bar means connected to said cabin, whereby the same may be towed when on land, and having lower and upper positions;
- float means movably mounted beneath said cabin, and having deck portions and hull portions, and movable support means connecting the same to said cabin, said float means being movable between at least a first raised road position, beneath said cabin, with said deck portions facing upwardly and said hull portions facing downwardly, and a lower water position beneath said cabin, with said deck portions facing upwardly and said hull portions facing downwardly;
- first controllably operable movement means connecting between said float means and said cabin, whereby said float means may be moved from one position to the other, and located and fastened in such position;
- said float means being movable between first, second and third positions which are respectively said first raised road position as aforesaid, a second water-mobile position, wherein said float means is located at a distance beneath said cabin, and a third outwardly spread water-stationary position, wherein said float means is extended outwardly on either side of said cabin, said float means in each of said positions having said deck portions facing upwardly and said hull portions facing downwardly; and
- said first controllably operable movement means comprises hydraulic cylinder means at the front and at the rear of said cabin, each extending in a generally vertical manner, and having operating rod means extendably retractable therefrom, a source of hydraulic pressure controllably connected to said hydraulic cylinders, thrust link means extending between said operating rod, and said float means, whereby extension of said operating rod causes downward and outward swinging of said float means, and retraction of said operating rod produces inward and upward swinging thereof.

4. A convertible house trailer as claimed in claim 3, further including:
- positional locking means for locking said first controllably operable movement means in a preselected position.

* * * * *